March 17, 1925.
P. M. SCHIBROWSKI
1,530,208
IMITATION CONTROL MEANS FOR JUVENILE VEHICLES
Filed March 5, 1924     2 Sheets-Sheet 1
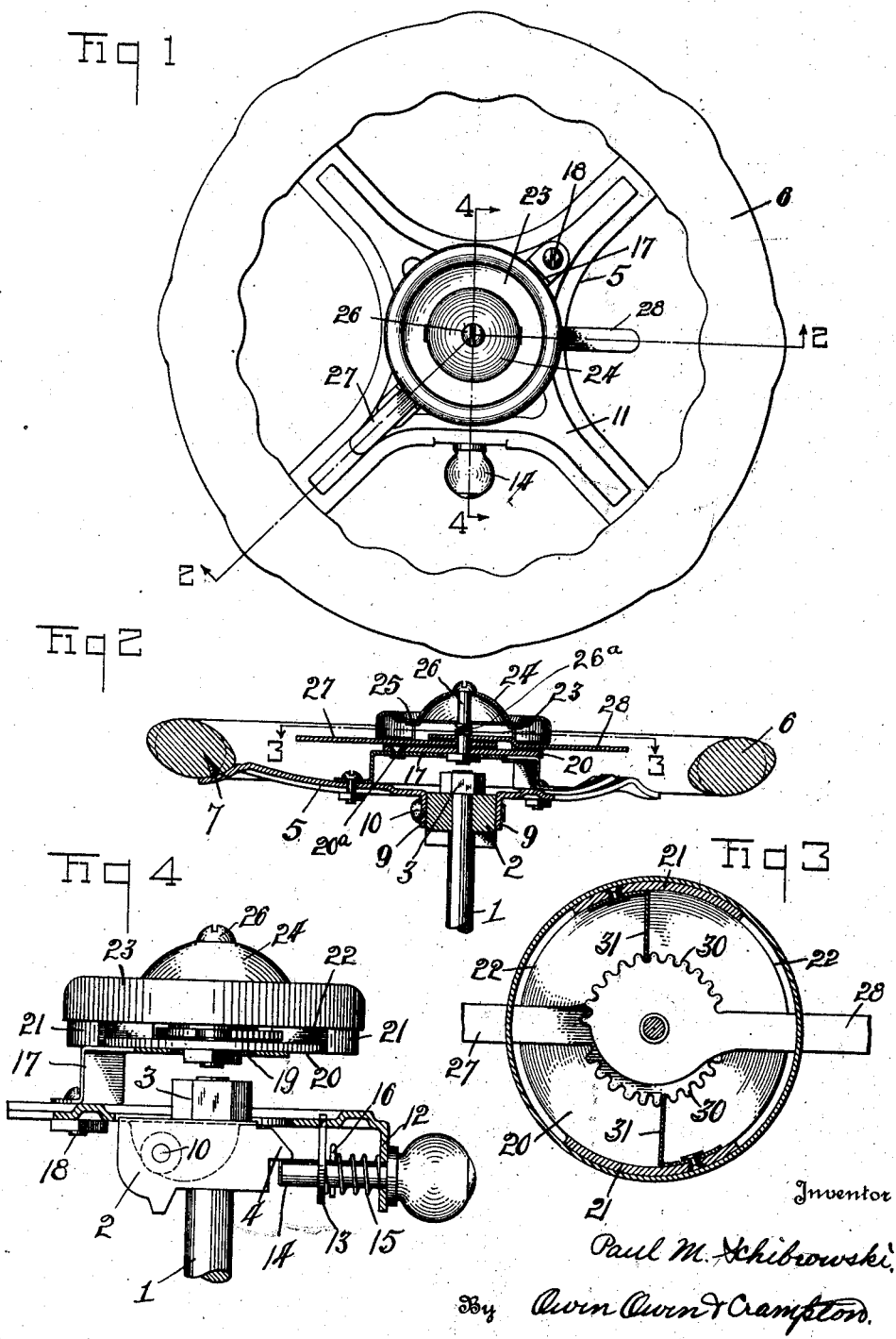
Inventor
Paul M. Schibrowski,
By Owen Owen & Crampton.
Attorneys.

March 17, 1925.
P. M. SCHIBROWSKI
1,530,208
IMITATION CONTROL MEANS FOR JUVENILE VEHICLES
Filed March 5, 1924  2 Sheets-Sheet 2
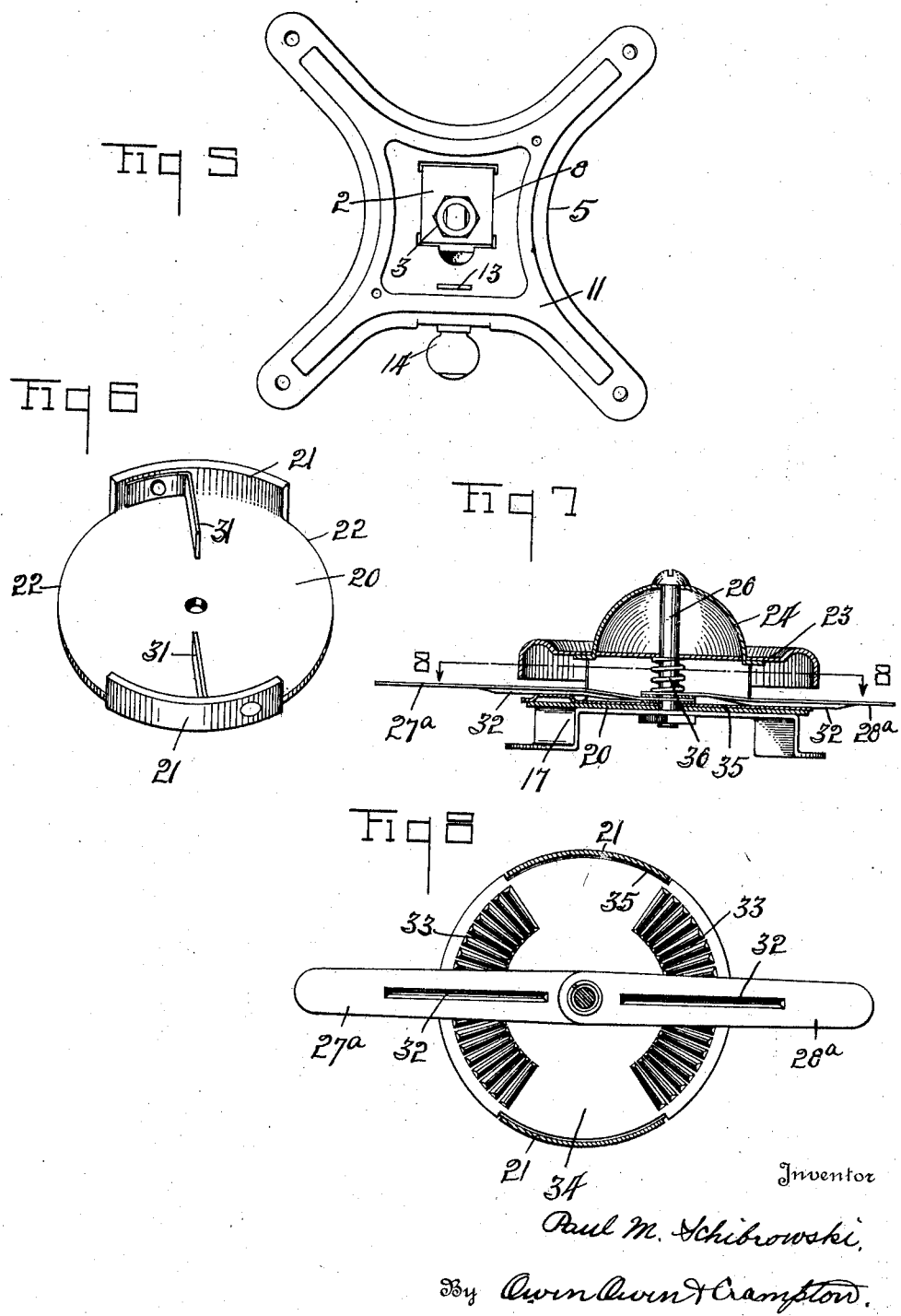

Patented Mar. 17, 1925.

1,530,208

UNITED STATES PATENT OFFICE.

PAUL M. SCHIBROWSKI, OF TOLEDO, OHIO, ASSIGNOR TO THE AMERICAN-NATIONAL COMPANY, OF TOLEDO, OHIO, A CORPORATION OF OHIO.

IMITATION CONTROL MEANS FOR JUVENILE VEHICLES.

Application filed March 5, 1924. Serial No. 696,969.

*To all whom it may concern:*

Be it known that I, PAUL M. SCHIBROWSKI, a citizen of the United States, and a resident of Toledo, in the county of Lucas and State of Ohio, have invented a new and useful Imitation Control Means for Juvenile Vehicles, which invention is fully set forth in the following specification.

This invention relates to a steering wheel for use on juvenile vehicles and to an imitation throttle and spark control means adapted to be mounted thereon.

The object of the invention is the provision of a steering control and also of a throttle and spark control for use on juvenile vehicles, such, for instance, as imitation automobiles, which controls resemble or imitate in appearance and action the corresponding controls of commercial automobiles, and are simple, efficient and inexpensive in construction and capable of having the parts thereof easily and quickly assembled.

The invention is fully described in the following specification, and while in its broader aspect it is capable of embodiment in numerous forms, one embodiment of the steering control and two embodiments of the throttle and spark control are illustrated in the accompanying drawings, in which,—

Figure 1 is a top plan view of a steering wheel and throttle and spark control mounted thereon embodying the invention. Figure 2 is a section on the line 2—2 in Fig. 1. Figure 3 is a section on the line 3—3 in Fig. 2. Figure 4 is a section on the line 4—4 in Fig. 1, with parts in full. Figure 5 is a top plan view of the steering wheel spider and its mounting, with the wheel rim and throttle and spark control means removed. Figure 6 is an enlarged perspective view of the bottom member of the throttle and spark control. Figure 7 is a central vertical section of a slightly modified form of the throttle and spark control with the supporting yoke in full, and Fig. 8 is a section on the line 8—8 in Fig. 7.

Referring to the drawings, 1 designates a steering wheel post and 2 a head, in the present instance, of rectangular form, which is mounted on the upper end of the post and rigidly secured thereto by a nut 3. The head 2 is, in the present instance, of rectangular form in cross-section and is provided at one end with a catch nose 4.

The steering wheel embodying the invention comprises a spider member 5 stamped from sheet metal and a rim 6 mounted on the outer end of the spider arms and secured thereto by screws 7, or in any other suitable manner. The spider 5 has a central, substantially flat hub portion having an opening 8 therein of suitable size and shape to receive the post-head 2, and has integral ears 9 struck down from its opposed sidewalls and forming bearings for a pin or pivot member 10, which projects through the head 2 at a side of the post 1 opposed to the catch nose 4 and permits the wheel to have vertical tilting movements relative to the post. The spider 5 is ribbed or depressed around the opening 8 and lengthwise of its arms, as shown at 11, Fig. 5, to add strength to the spider.

The central or body portion of the spider is provided at a side edge thereof adjacent to the catch nose 4 of the post-head 2, and between two of the arms of the spider, with an integral down-turned apertured ear 12, and is provided in inwardly spaced relation to such ear with a second outwardly apertured ear 13 which, in the present instance, is not integral with the spider but is rigidly connected thereto. A catch pin 14 is mounted for reciprocatory movements in the apertures of the ears 12 and 13 and adapted to engage at its inner end under the catch nose 4 of the head 2 to retain the steering wheel in operative relation to the post. The outer end of the pin 14 is headed to facilitate grasping the same, and a coiled spring 15 is mounted on the pin between the ear 12 and a cross pin 16 on the pin 14 and acts to normally retain the catch pin in catch engagement with the head.

Mounted on the top of the spider 5 and spanning the central opening 5 thereof diametrically of the spider is a U-shaped supporting yoke 17, the legs of which are turned outwardly to form feet which rest on the inner end portions of opposed arms of the spider 5 and are rigidly secured thereto by bolts 18, or in any other suitable manner. The cross portion of the yoke 17 is flat and extends across the axis of the post and is provided, in the present instance, with a central opening 19. A plate 20 of disc form is mounted on the cross portion of the yoke 17 in concentric relation to its opening 19 and has an upstanding side wall 21 which is cut away, in the present instance, at opposite sides of the disc axis to provide side openings 22.

A cap 23 is mounted over the plate 20 with its side wall telescoping over the segmental wall portions 21 of said plate and terminating short of the plate 20 so that an open space is provided between the plate 20 and side wall of the cap 23 in register with the side openings 22 of the plate. The cap 23 is preferably provided with a centrally disposed dome member 24 of semi-spherical form, which seats at its edge on the top of the cap and is secured thereto by ears 25 projecting from the dome edge through registering openings in the cap and being bent under the cap to prevent withdrawal.

The plate 20 and yoke 17 are rigidly secured together, in the present instance, by riveting, as shown at 20$^a$ in Fig. 2, or in any other suitable manner, and the plate 20, cap 23 and dome 24 are secured together in assembled relation by a center bolt 26, the nut member of which is disposed, in the present instance, at the opening 19 of the yoke member. Imitation throttle and spark control levers 27 and 28 are pivotally mounted at their inner ends in lapping relation on the bolt 26 and have their outer ends projecting outwardly between the plate 20 and side walls of the cap 23 and through the openings 22 or spaces provided between the wall segments 21 of the plate so that the outer ends of the arms are in accessible position to permit operating the same. Each lever 27 and 28 is provided, in the present instance, at its inner end, concentric with its axis, with a segmentally toothed edge portion 30 in snap engagement with the free end of a spring finger 31 projecting inward from the adjacent wall portion 21 of the plate 20. Interposed between the cap 23 and the lever 28 is a coiled spring 26$^a$ which yieldingly holds the levers in proper relation to the spring fingers 21. A movement of either control lever causes the engaging finger 31 to snap into and out of engagement with the lever teeth 30 and to emit a clicking sound in imitation of the sound effected by the movement of the throttle and spark control levers of some makes of automobiles, which sound indicates action and is very pleasing to the operators of juvenile vehicles.

In the spark and throttle control means, shown in Figs. 7 and 8, the spring fingers 31 and notched inner end portions of the control 27 and 28 are omitted and each arm provided in lieu thereof with a depressed longitudinally extending rib 32 which, when the associated lever 27$^a$ and 28$^a$ is moved, works across a serrated or toothed surface 33 formed segmentally on a plate 34 that is mounted over and rests on the bottom plate 20. The plate 34 is of segmental form and is prevented from turning relative to the plate 20 by having edge notches 35 which receive the respective wall portions 21 of the bottom plate. A coiled compression spring 36 is mounted on the bolt 26 between the cap 23 and the control arms to act on the arms to yieldingly hold the ribs 32 thereof in engagement with the respective toothed surfaces 33.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:—

1. An imitation throttle and spark lever control having a mount, a base member and a cap member carried by the mount and forming an interior chamber with an opening at a side thereof, a pivot member carried by said parts and projecting through the chamber formed thereby, throttle and spark control levers pivoted on said pivot and projecting from the chamber, and means within the chamber and co-acting with the levers to transmit a clicking sound when either lever is moved.

2. An imitation throttle and spark control for juvenile vehicles having a support, a housing means mounted on the support and having openings at its sides, a pivot pin projecting through the housing centrally thereof, a pair of levers pivotally carried by the pin and projecting laterally from the housing through said openings, and means disposed within and secured to the housing and cooperating with the levers to impart a clicking sound when either lever is moved.

3. An imitation control means for juvenile vehicles comprising a supporting member, a housing carried by said member and having a side opening, a pivot pin disposed centrally within the housing, a control mounted on the pin and projecting laterally from the housing through the side opening, and means disposed within and secured to the housing and cooperating with the lever to impart a clicking sound when the lever is moved.

4. In an imitation control of the class described for juvenile vehicles, a U-shaped supporting member, a base plate carried by the member and having an upstanding side wall cut-away to form side openings, a cap mounted over the side wall of the base member and terminating at its outer edge above the base member, a pivot member centrally connecting the base member and cap to retain them in assembled relation, levers pivotally mounted at their inner ends at the pivot member and projecting laterally through the side openings of the base member and beyond the same, and means acting on each lever within the base member and cooperating therewith to impart a clicking sound when either lever is moved.

5. An imitation control for juvenile vehicles having in combination a steering wheel, a U-shaped yoke member mounted on the steering wheel spider, a housing mounted on the yoke member and having a side opening, a pivot member carried by the housing centrally thereof, an imitation control lever mounted on the pivot member within the housing and projecting laterally from the housing through its side opening, and means co-acting with the lever within the housing for imparting a clicking sound when the lever is moved.

6. An imitation control for juvenile vehicles having in combination a steering wheel, a U-shaped yoke member mounted on a steering wheel spider diametrically thereof, a housing mounted on the yoke member and having a central pivot and openings at its sides, imitation control levers mounted at their inner ends on the pivot within the housing and projecting at their outer ends without the housing through the side openings thereof, and means within the housing co-acting with the levers to impart a clicking sound when either is moved.

7. An imitation control for juvenile vehicles having in combination a support, a yoke member mounted on the support, a disc-like plate mounted on the yoke and having spaced upturned edge wall portions, a cap mounted over the plate in telescoping relation to its edge wall portions, a pivot member projecting centrally through the cap and plate to secure the same together, imitation control levers pivotally mounted on the pivot member between the cap and plate and having their outer ends projecting laterally from the plate and cap through the spaces between the sidewall, and means yieldingly co-acting with the levers to impart a clicking sound when the levers are moved.

In testimony whereof, I have hereunto signed my name to this specification.

PAUL M. SCHIBROWSKI.